United States Patent
Takagi

(10) Patent No.: US 8,724,933 B2
(45) Date of Patent: May 13, 2014

(54) OPTICAL DEVICE

(75) Inventor: Kazuhisa Takagi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 110 days.

(21) Appl. No.: 13/399,350

(22) Filed: Feb. 17, 2012

(65) Prior Publication Data

US 2013/0016939 A1 Jan. 17, 2013

(30) Foreign Application Priority Data

Jul. 12, 2011 (JP) .................................. 2011-154213

(51) Int. Cl.
*G02F 1/035* (2006.01)
(52) U.S. Cl.
USPC ............................................................. 385/3
(58) Field of Classification Search
None
See application file for complete search history.

(56) References Cited

U.S. PATENT DOCUMENTS

2009/0238512 A1 9/2009 Sugiyama
2010/0316326 A1 12/2010 Sugiyama

FOREIGN PATENT DOCUMENTS

JP 2009-229592 A 10/2009
JP 2010-286770 A 12/2010

*Primary Examiner* — Jerry Rahll
(74) *Attorney, Agent, or Firm* — Leydig, Voit & Mayer, Ltd.

(57) ABSTRACT

An optical device includes: a substrate; an optical branching filter on the substrate and dividing input light into first and second input lights; first and second Mach-Zehnder optical modulators on the substrate and respectively modulating the first and second input lights; and an optical coupler on the substrate and combining light modulated by the first Mach-Zehnder optical modulator and light modulated by the second Mach-Zehnder optical modulator. Each of the first and second Mach-Zehnder optical modulator includes two optical waveguides, a phase modulation electrode applying a modulation voltage across the optical waveguides to change phases of light in the optical waveguides, and a feed line and a terminal line respectively connected to opposite ends of the phase modulation electrode to supply the modulation voltage to the phase modulation electrode. The feed lines and the terminal lines respectively extend to peripheral portions of the substrate.

14 Claims, 3 Drawing Sheets

OPTICAL DEVICE

BACKGROUND OF THE INVENTION

1. Field of the Invention

The present invention relates to an optical device used in a transmitter for optical fiber communication, and in particular to an optical device including a Mach-Zehnder optical modulator for DQPSK (Differential Quadrature Phase Shift Keying).

2. Background Art

Mach-Zehnder optical modulators are being used in transmitters for optical fiber communication. In a Mach-Zehnder optical modulator, a flow of light is separated into two flows of light, which propagate through two different optical waveguides and are again combined into one. Phase modulation electrodes are provided on the optical waveguides. From the phase modulation electrodes, modulation voltages are applied across the optical waveguides to change the phases of light in the optical waveguides. To supply the modulation voltages to the phase modulation electrode, a feed line and a terminal line are respectively connected to opposite ends of each phase modulation electrode.

Digital signal modulation methods include differential quadrature phase shift keying (DQPSK) that assigns 2-bit data to each of four modulated phases. An optical modulator for DQPSK has two Mach-Zehnder optical modulators and therefore has four optical waveguides in total (see, for example, Japanese Patent Laid-Open No. 2009-229592).

SUMMARY OF THE INVENTION

In the conventional optical modulator for DQPSK, the phase modulation electrodes of the two Mach-Zehnder optical modulators are in a state of being superposed one on another as seen in a direction perpendicular to the direction along which the optical waveguides extend. This means that when the feed lines and the terminal lines are led out to peripheral portions of the substrate, they are necessarily led over three at the maximum of the optical waveguides. Therefore, the lengths of the feed lines and the terminal lines laid in the device are increased and a large parasitic capacitance is produced across the insulating film between the feed and terminal lines and semiconductor layers, resulting in degradation in frequency characteristics.

In view of the above-described problems, an object of the present invention is to provide an optical device which can prevent degradation in the frequency characteristics.

According to the present invention, an optical device includes: a substrate; an optical branching filter on the substrate and dividing input light into first and second input lights; first and second Mach-Zehnder optical modulators on the substrate and respectively modulating the first and second input lights; and an optical coupler on the substrate and combining lights modulated by the first and second Mach-Zehnder optical modulators, wherein the first Mach-Zehnder optical modulator includes two first optical waveguides, a first phase modulation electrode applying modulation voltage across the first optical waveguide to change phases of light in the first optical waveguide, and a first feed line and a first terminal line respectively connected to opposite ends of the first phase modulation electrode to supply modulation voltage to the first phase modulation electrode, the second Mach-Zehnder optical modulator includes two second optical waveguides, a second phase modulation electrode applying modulation voltage across the second optical waveguide to change phases of light in the second optical waveguide, and a second feed line and a second terminal line respectively connected to opposite ends of the second phase modulation electrode to supply modulation voltage to the second phase modulation electrode, the first and second feed lines and the first and second terminal lines are respectively led out to peripheral portions of the substrate, and the first and second phase modulation electrodes are not superposed one on another as seen in any direction perpendicular to a direction of extension of the first and second optical waveguides.

The present invention makes it possible to prevent degradation in the frequency characteristics.

Other and further objects, features and advantages of the invention will appear more fully from the following description.

DETAILED DESCRIPTION OF THE PREFERRED EMBODIMENTS

An optical device according to the embodiments of the present invention will be described with reference to the drawings. The same components will be denoted by the same symbols, and the repeated description thereof may be omitted.

First Embodiment

Figure 1:
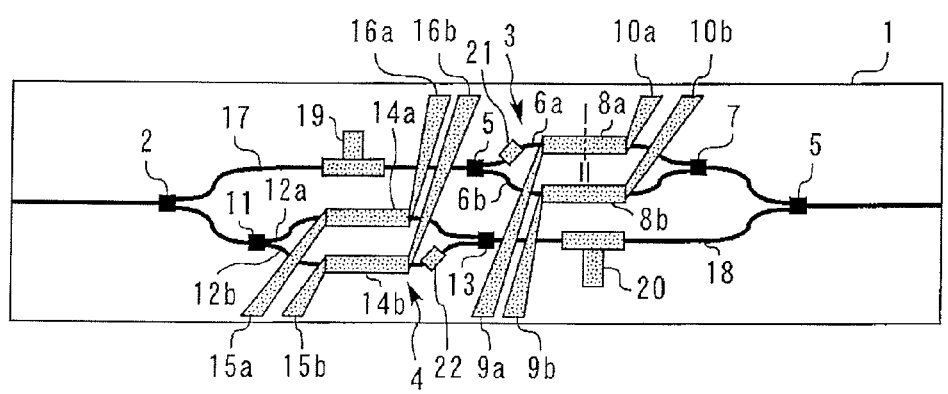
FIG. 1 is a top view of an optical device according to a first embodiment of the present invention.

FIG. 1 is a top view of an optical device according to a first embodiment of the present invention. An optical branching filter 2, Mach-Zehnder optical modulators 3 and 4, and an optical coupler 5 are provided on an n-type InP substrate 1. The optical branching filter 2 divides input light into first and second input lights. The Mach-Zehnder optical modulators 3 and 4 respectively modulate the first and second input lights. The optical coupler 5 combines the lights modulated by the Mach-Zehnder optical modulators 3 and 4.

The Mach-Zehnder optical modulator 3 has an optical branching filter 5, two optical waveguides 6a and 6b, and an optical coupler 7. Phase modulation electrodes 8a and 8b are provided to respectively apply modulation voltages across the optical waveguides 6a and 6b to change the phases of lights in the optical waveguides 6a and 6b. A feed line 9a and a terminal line 10a are respectively connected to opposite ends of the phase modulation electrode 8a to supply the modulation voltage to the phase modulation electrode 8a. A feed line 9b and a terminal line 10b are respectively connected to opposite ends of the phase modulation electrode 8b to supply the modulation voltage to the phase modulation electrode 8b.

The Mach-Zehnder optical modulator 4 has an optical branching filter 11, two optical waveguides 12a and 12b, and an optical coupler 13. Phase modulation electrodes 14a and 14b are provided to respectively apply modulation voltages across the optical waveguides 12a and 12b to change the phases of lights in the optical waveguides 12a and 12b. A feed line 15a and a terminal line 16a are respectively connected to opposite ends of the phase modulation electrode 14a to supply the modulation voltage to the phase modulation electrode 14a. A feed line 15b and a terminal line 16b are respectively connected to opposite ends of the phase modulation electrode 14b to supply the modulation voltage to the phase modulation electrode 14b. The feed lines 9a, 9b, 15a, and 15b and the terminal lines 10a, 10b, 16a, and 16b are respectively led out to peripheral portions of the n-type MP substrate 1.

The Mach-Zehnder optical modulator 3 and the Mach-Zehnder optical modulator 4 are disposed by being shifted from each other along the directions along which the optical waveguides 6a, 6b, 12a, and 12b extend. Therefore the phase modulation electrodes 8a and 8b and the phase modulation electrodes 14a and 14b are not superposed one on another as seen in any direction perpendicular to the direction of extension of the optical waveguides 6a, 6b, 12a, and 12b.

An optical input waveguide 17 is connected between the optical branching filter 2 and the Mach-Zehnder optical modulator 3. An optical output waveguide 18 is connected between the Mach-Zehnder optical modulator 4 and the optical coupler 5. A phase adjustment electrode 19 is provided to apply a direct current voltage across the optical input waveguide 17 to change the phase of light in the optical input waveguide 17. A phase adjustment electrode 20 is provided to apply a direct current voltage across the optical output waveguide 18 to change the phase of light in the optical output waveguide 18. Similarly, a phase adjustment electrode 21 is provided in the optical waveguide between the optical branching filter 5 and the phase modulation electrode 8a, and a phase adjustment electrode 22 is provided in the optical waveguide between the phase modulation electrode 14b and the optical coupler 13.

Figure 2:
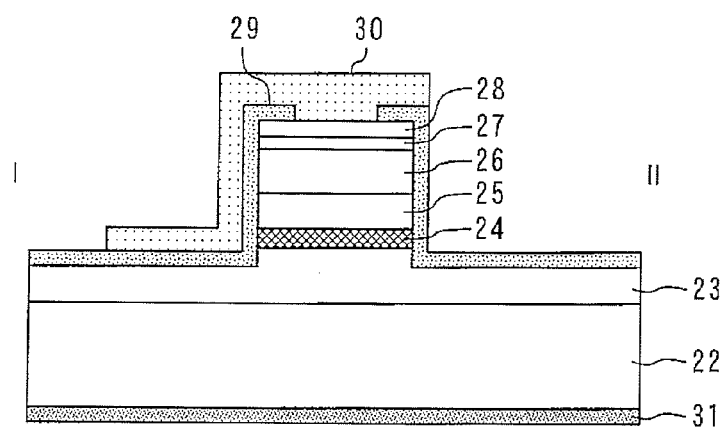
FIG. 2 is a figure taken along line I-II in FIG. 1.

FIG. 2 is a figure taken along line I-II in FIG. 1. An n-type InP clad layer 23, an undoped InGaAsP multi-quantum well active layer 24, an undoped InP clad layer 25, a p-type InP clad layer 26, a p-type InGaAsP-BDR layer 27 and a p-type InGaAs contact layer 28 are successively stacked on the n-type InP substrate 1. These semiconductor layers are covered with SiN insulating film 29. The SiN insulating film 29 has an opening at a top portion of the ridge formed by the semiconductor layers. An anode electrode 30 is connected to the p-type InGaAs contact layer 28 through this opening. A cathode electrode 31 is connected to a lower surface of the n-type InP substrate 1. In this embodiment, the anode electrode 30 is identical to the phase modulation electrode 8a.

Figure 3:
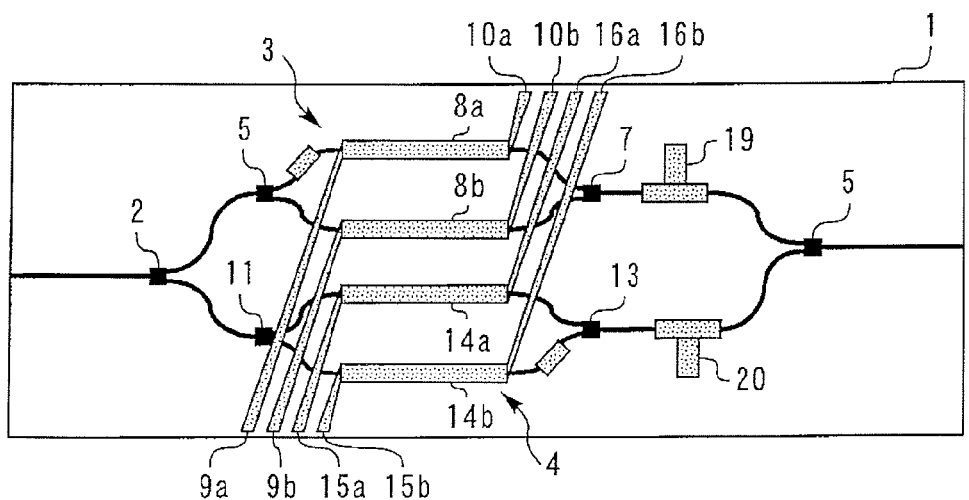
FIG. 3 is a top view of an optical device according to the reference example.

The effects of the present embodiment will be described in comparison with those of a reference example. FIG. 3 is a top view of an optical device according to the reference example. In the reference example, the Mach-Zehnder optical modulator 3 and the Mach-Zehnder optical modulator 4 are disposed side by side. Accordingly, the phase modulation electrodes 8a and 8b and the phase modulation electrodes 14a and 14b extend beside each other and are superposed one on another as seen in a direction perpendicular to the direction of extension of the optical waveguides 6a, 6b, 12a, and 12b. This means that when the feed lines 9a, 9b, 15a, and 15b and the terminal lines 10a, 10b, 16a, and 16b are led out to peripheral portions of the n-type InP substrate 1, they are necessarily led over three at the maximum of the optical waveguides. Therefore, the lengths of the feed lines 9a, 9b, 15a, and 15b and the terminal lines 10a, 10b, 16a, and 16b laid in the device are increased and a large parasitic capacitance is produced across the SiN insulating film 29 between the feed lines 9a, 9b, 15a, and 15b and the terminal lines 10a, 10b, 16a, and 16b and the semiconductor layers, resulting in degradation in the frequency characteristics.

On the other hand, in the present embodiment, the phase modulation electrodes 8a and 8b and the phase modulation electrodes 14a and 14b do not extend beside each other and are not superposed one on another as viewed in any direction perpendicular to the direction of extension of the optical waveguides 6a, 6b, 12a, and 12b. Therefore, the feed lines and the terminal lines of one of the Mach-Zehnder optical modulators can be led out to peripheral portions of the n-type InP substrate 1 without being led over the other of the Mach-Zehnder optical modulators. Consequently, the lengths of the feed lines 9a, 9b, 15a, and 15b and the terminal lines 10a, 10b, 16a, and 16b laid in the device can be reduced, thus enabling prevention of degradation in the frequency characteristics due to a parasitic capacitance across the feed lines 9a, 9b, 15a, and 15b and the terminal lines 10a, 10b, 16a, and 16b.

In the comparative example, the number of optical waveguides extending beside each other in the device is four at the maximum. In the present embodiment, the number of optical waveguides extending beside each other is reduced to three at the maximum. Therefore the width of the device can be reduced and a reduction in manufacturing cost of the device and a resource saving effect can be achieved.

In the present embodiment, the phase adjustment electrode 19 is provided in the optical input waveguide 17 between the optical branching filter 2 and the Mach-Zehnder optical modulator 3, and the phase adjustment electrode 20 is provided in the optical output waveguide 18 between the Mach-Zehnder optical modulator 4 and the optical coupler 5. There is, therefore, no need to additionally provide spaces for the phase adjustment electrodes 19 and 20 in the waveguides, and the length of the device can therefore be shorter.

In the present embodiment, the active layer is formed of an undoped InGaAsP multi-quantum well. However, the present invention is not limited to this. The active layer may alternatively be formed of an AlGaInAs multi-quantum well, InGaAsP bulk, AlGaInAs bulk, or the like.

Second Embodiment

Figure 4:
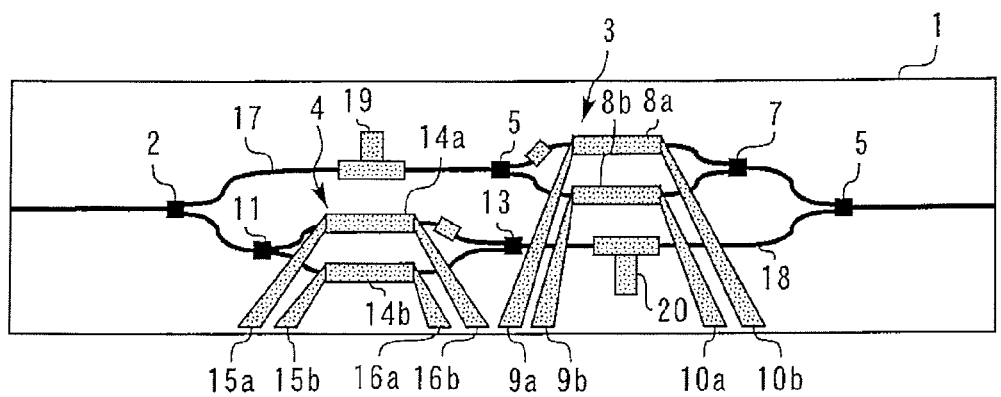
FIG. 4 is a top view of an optical device according to a second embodiment of the present invention.

FIG. 4 is a top view of an optical device according to a second embodiment of the present invention. The feed lines 9a, 9b, 15a, and 15b and the terminal lines 10a, 10b, 16a, and 16b are led out to one side of the n-type InP substrate 1. With this arrangement, the same effects as those of the first embodiment can also be obtained. Also, a reduction in manufacturing cost of the device and a resource saving effect can be achieved as a result of integration.

Third Embodiment

Figure 5:
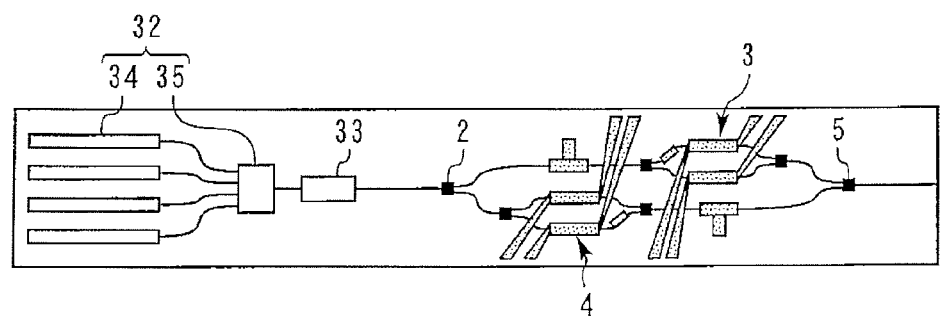
FIG. 5 is a top view of an optical device according to a third embodiment of the present invention.

FIG. 5 is a top view of an optical device according to a third embodiment of the present invention. A light emitting device 32 and an optical amplifier 33 are integrated on the n-type InP substrate 1. The light emitting device 32 has a laser diode array 34 and an optical coupler 35 that combines output lights from the laser diode array 34. The optical amplifier 33 amplifies light emitted from the light emitting device 32 and outputs the amplified light to the optical branching filter 2. With this arrangement, the same effects as those of the first embodiment can also be obtained. Also, a reduction in manufacturing cost of the device and a resource saving effect can be achieved as a result of integration. Note that A single laser diode may be used for the light emitting device 32.

Fourth Embodiment

Figure 6:
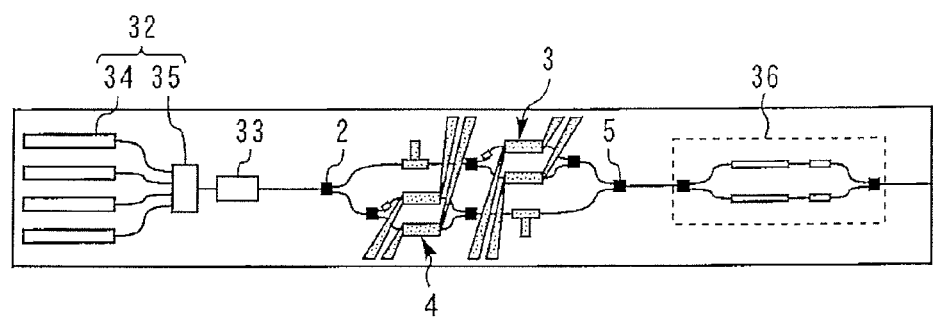
FIG. 6 is a top view of an optical device according to a fourth embodiment of the present invention.

FIG. 6 is a top view of an optical device according to a fourth embodiment of the present invention. A Mach-Zehnder optical modulator 36 for return to zero (RZ) modulation is integrated on the n-type InP substrate 1 in addition to the arrangement according to the third embodiment. The Mach-Zehnder optical modulator 36 for RZ modulation modulates output light from the optical coupler 5. With this arrangement, the same effects as those of the first embodiment can also be obtained. Also, a reduction in manufacturing cost of the device and a resource saving effect can be achieved as a result of integration.

Fifth Embodiment

Figure 7:
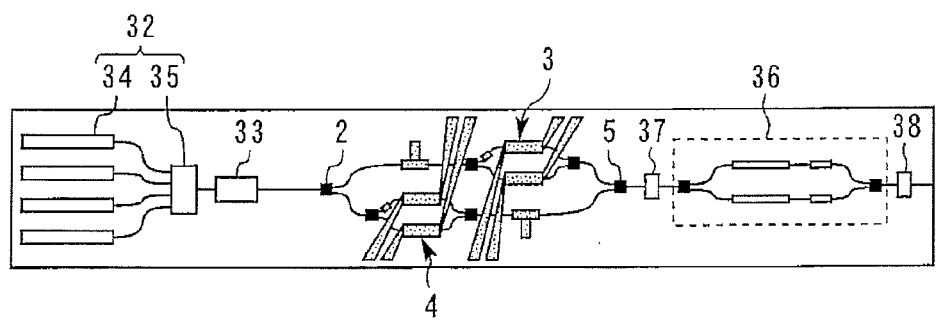
FIG. 7 is a top view of an optical device according to a fifth embodiment of the present invention.

FIG. 7 is a top view of an optical device according to a fifth embodiment of the present invention. Light receiving components 37 and 38 for monitoring the intensity of light in waveguides are integrated on the n-type InP substrate in addition to the arrangement according to the fourth embodiment. The light receiving component 37 monitors the intensity of output light from the optical coupler 5. The light receiving component 38 monitors the intensity of output light from the Mach-Zehnder optical modulator 36 for RZ modulation. With this arrangement, the same effects as those of the first embodiment can also be obtained. Also, a reduction in manufacturing cost of the device and a resource saving effect can be achieved as a result of integration.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2011-154213, filed on Jul. 12, 2011 including specification, claims, drawings and summary, on which the Convention priority of the present application is based, is incorporated herein by reference in its entirety.

What is claimed is:

1. An optical device comprising:
a substrate;
a first optical branching filter on the substrate and dividing input light into first and second input lights;
first and second Mach-Zehnder optical modulators on the substrate and respectively modulating the first and second input lights; and
a first optical coupler on the substrate and combining light modulated by the first Mach-Zehnder modulator and light modulated by the second Mach-Zehnder optical modulator to produce modulated output light, wherein
the first Mach-Zehnder optical modulator includes first and second optical waveguides, a first phase modulation electrode applying a first modulation voltage across the first optical waveguide to change phase of light propagating in the first optical waveguide, a second phase modulation electrode applying a second modulation voltage across the second optical waveguide to change phase of light propagating in the second optical waveguide, a first feed line and a first terminal line, respectively connected to opposite ends of the first phase modulation electrode, for supplying the first modulation voltage to the first phase modulation electrode, and a second feed line and a second terminal line, respectively connected to opposite ends of the second phase modulation electrode, for supplying the second modulation voltage to the second phase modulation electrode, the second Mach-Zehnder optical modulator includes third and fourth optical waveguides, a third phase modulation electrode applying a third modulation voltage across the third optical waveguide to change phase of light propagating in the third optical waveguide, a fourth phase modulation electrode applying a fourth modulation voltage across the fourth optical waveguide to change phase of light propagating in the fourth optical waveguide, a third feed line and a third terminal line, respectively connected to opposite ends of the third phase modulation electrode, for supplying the third modulation voltage to the third phase modulation electrode, and a fourth feed line and a fourth terminal line, respectively connected to opposite ends of the fourth phase modulation electrode, for supplying the fourth modulation voltage to the fourth phase modulation electrode, the first, second, third, and fourth feed lines and the first, second, third, and fourth terminal lines respectively extend to peripheral portions of the substrate, and the first and second phase modulation electrodes are both located on the substrate at locations closer to the first optical coupler than to the first optical branching filter, the third and fourth phase modulation electrodes are both located on the substrate at locations closer to first optical branching filter than to the first optical combiner, and the first and second phase modulation electrodes are not crossed by any straight line that is perpendicular to the first, second, third, and fourth optical waveguides and that crosses the third and fourth phase modulation electrodes.

2. The optical device according to claim 1, further comprising:
an optical input waveguide connected between the first optical branching filter and the first Mach-Zehnder optical modulator;
an optical output waveguide connected between the second Mach-Zehnder optical modulator and the first optical coupler;
a first phase adjustment electrode applying a first direct current voltage across the optical input waveguide to change phase of light propagating in the optical input waveguide; and
a second phase adjustment electrode applying a second direct current voltage across the optical output waveguide to change phase of light propagating in the optical output waveguide.

3. The optical device according to claim 1, further comprising:
a second optical branching filter connected between the optical input waveguide and the first Mach-Zehnder optical modulator;
a second optical coupler connected between the first Mach-Zehnder optical modulator and the first optical coupler;
a third optical branching filter connected between the first optical branching filter and the second Mach-Zehnder optical modulator; and
a third optical coupler connected between tile second Mach-Zehnder optical modulator and the optical output waveguide.

4. The optical device according to claim 1, wherein the first, second, third, and fourth feed lines and the first, second, third, and fourth terminal lines commonly extend to a first side of the substrate.

5. The optical device according to claim 1, wherein the first, second, third, and fourth feed lines commonly extend to a first side of the substrate, and the first, second, third, and fourth terminal lines commonly extend to a second side of the substrate that is opposite the first side of the substrate.

6. The optical device according to claim 1, further comprising:
a light emitting device integrated on the substrate; and
an optical amplifier integrated on the substrate, amplifying light emitted from the light emitting device, and outputting the light amplified by the optical amplifier to the first optical branching filter.

7. The optical device according to claim 1, further comprising an optical modulator integrated on the substrate and modulating light output from the first optical coupler.

8. The optical device according to claim 1, further comprising a light detecting component integrated on the substrate and monitoring intensity of light output from the first optical coupler.

9. An optical device comprising:
a substrate;
a first optical branching filter on the substrate and dividing input light into first and second input lights;
first and second Mach-Zehnder optical modulators on the substrate and respectively modulating the first and second input lights; and
a first optical coupler on the substrate and combining light modulated by the first Mach-Zehnder modulator and light modulated by the second Mach-Zehnder optical modulator to produce modulated output light, wherein
the first Mach-Zehnder optical modulator includes first and second optical waveguides, a first phase modulation electrode applying a first modulation voltage across the first optical waveguide to change phase of light propagating in the first optical waveguide, a second phase modulation electrode applying a second modulation voltage across the second optical waveguide to change phase of light propagating in the second optical waveguide, a first feed line and a first terminal line, respectively connected to opposite ends of the first phase modulation electrode, for supplying the first modulation voltage to the first phase modulation electrode, and a second feed line and a second terminal line, respectively connected to opposite ends of the second phase modulation electrode, for supplying the second modulation voltage to the second phase modulation electrode,
the second Mach-Zehnder optical modulator includes third and fourth optical waveguides, a third phase modulation electrode applying a third modulation voltage across the third optical waveguide to change phase of light propagating in the third optical waveguide, a fourth phase modulation electrode applying a fourth modulation voltage across the fourth optical waveguide to change phase of light propagating in the fourth optical waveguide, a third feed line and a third terminal line, respectively connected to opposite ends of the third phase modulation electrode, for supplying the third modulation voltage to the third phase modulation electrode, and a fourth feed line and a fourth terminal line, respectively connected to opposite ends of the fourth phase modulation electrode, for supplying the fourth modulation voltage to the fourth phase modulation electrode,
the first, second, third, and fourth feed lines and the first, second, third, and fourth terminal lines respectively extend to peripheral portions of the substrate, and
the first and second phase modulation electrodes are both located on the substrate at locations closer to the first optical coupler than to the first optical branching filter, the third and fourth phase modulation electrodes are both located on the substrate at locations closer to first optical branching filter than to the first optical combiner, and the first and second optical waveguides are not crossed by any straight line that is perpendicular to the first, second, third, and fourth optical waveguides and that crosses the third and fourth optical waveguides.

10. The optical device according to claim 9, further comprising:
an optical input waveguide connected between the first optical branching filter and the first Mach-Zehnder optical modulator;
an optical output waveguide connected between the second Mach-Zehnder optical modulator and the first optical coupler;
a first phase adjustment electrode applying a first direct current voltage across the optical input waveguide to change phase of light propagating in the optical input waveguide; and
a second phase adjustment electrode applying a second direct current voltage across the optical output waveguide to change phase of light propagating in the optical output waveguide.

11. The optical device according to claim 10, further comprising:
a second optical branching filter connected between the optical input waveguide and the first Mach-Zehnder optical modulator;
a second optical coupler connected between the first Mach-Zehnder optical modulator and the first optical coupler;
a third optical branching filter connected between the first optical branching filter and the second Mach-Zehnder optical modulator; and
a third optical coupler connected between the second Mach-Zehnder optical modulator and the optical output waveguide.

12. The optical device according to claim 9, wherein the first, second, third, and fourth feed lines and the first, second, third, and fourth terminal lines commonly extend to a first side of the substrate.

13. The optical device according to claim 9, wherein the first, second, third, and fourth feed lines commonly extend to a first side of the substrate, and the first, second, third, and fourth terminal lines commonly extend to a second side of the substrate that is opposite the first side of the substrate.

14. The optical device according to claim 9, further comprising:
a light emitting device integrated on the substrate; and
all optical amplifier integrated on the substrate, amplifying light emitted from the light emitting device, and outputting the light amplified by the optical amplifier to the first optical branching filter.

* * * * *